(12) United States Patent
Lee et al.

(10) Patent No.: US 7,401,161 B2
(45) Date of Patent: Jul. 15, 2008

(54) HIGH PERFORMANCE STORAGE ARRAY INTERCONNECTION FABRIC USING MULTIPLE INDEPENDENT PATHS

(75) Inventors: Whay S. Lee, Newark, CA (US); Randall Rettberg, Danville, CA (US); Nisha D. Talagala, Fremont, CA (US); Chia Y. Wu, Newark, CA (US); Fay Chong, Jr., Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1570 days.

(21) Appl. No.: 09/739,924

(22) Filed: Dec. 18, 2000

(65) Prior Publication Data

US 2003/0221018 A1 Nov. 27, 2003

(51) Int. Cl.
*G06F 15/16* (2006.01)
(52) U.S. Cl. ........................ 709/249; 709/240
(58) Field of Classification Search ................ 709/249
See application file for complete search history.

(56) References Cited

U.S. PATENT DOCUMENTS

| | | | |
|---|---|---|---|
| 4,862,496 A | 8/1989 | Kelly et al. | |
| 4,980,822 A | 12/1990 | Brantley et al. | |
| 5,088,032 A | 2/1992 | Bosack | |
| 5,101,480 A | 3/1992 | Shin et al. | |
| 5,105,424 A | 4/1992 | Flaig et al. | |
| 5,187,671 A | 2/1993 | Cobb | |
| 5,583,990 A | 12/1996 | Birrittella et al. | |
| 5,612,897 A * | 3/1997 | Rege | 709/219 |
| 5,613,069 A | 3/1997 | Walker | |
| 5,625,836 A | 4/1997 | Barker et al. | |
| 5,627,990 A | 5/1997 | Cord et al. | |
| 5,646,936 A | 7/1997 | Shah et al. | |
| 5,671,356 A | 9/1997 | Wang | |
| 5,682,479 A | 10/1997 | Newhall et al. | |

(Continued)

FOREIGN PATENT DOCUMENTS

DE 199 23 245 5/1999

(Continued)

OTHER PUBLICATIONS

Dennison et al. (High-Performance Bidirectional Signaling in VLSI Systems Artificial Intelligence Laboratory (Laboratory for Computer Science, Massachusetts Institute of Technology, Oct. 12, 1992).*

(Continued)

*Primary Examiner*—Jason Cardone
*Assistant Examiner*—Mitra Kianersi
(74) *Attorney, Agent, or Firm*—Robert C. Kowert; Meyertons, Hood, Kivlin, Kowert & Goetzel, P.C.

(57) ABSTRACT

A storage array interconnection fabric may be configured using multiple independent paths. A storage system including a plurality of communication paths is configured for connecting each node of a plurality of nodes forming an interconnection fabric. Each of the communications paths is an independent communications path. In addition, a first portion of the plurality of nodes is configured to communicate with a plurality of mass storage devices such as disk drives. A second portion of the plurality of nodes may be configured to communicate with a host.

20 Claims, 12 Drawing Sheets

U.S. PATENT DOCUMENTS

| | | | |
|---|---|---|---|
| 5,689,646 | A | 11/1997 | Thorson |
| 5,689,661 | A | 11/1997 | Hayashi et al. |
| 5,701,416 | A | 12/1997 | Thorson et al. |
| 5,720,025 | A | 2/1998 | Wilkes et al. |
| 5,729,756 | A | 3/1998 | Hayashi |
| 5,737,628 | A | 4/1998 | Birrittella et al. |
| 5,764,641 | A | 6/1998 | Lin |
| 5,781,534 | A | 7/1998 | Perlman et al. |
| 5,809,237 | A * | 9/1998 | Watts et al. ............... 709/202 |
| 5,862,312 | A | 1/1999 | Mann et al. |
| 5,912,893 | A | 6/1999 | Rolfe et al. |
| 5,970,232 | A | 10/1999 | Passint et al. |
| 6,016,510 | A | 1/2000 | Quattromani et al. |
| 6,023,753 | A | 2/2000 | Pechanek et al. |
| 6,049,527 | A | 4/2000 | Isoyama et al. |
| 6,055,618 | A | 4/2000 | Thorson |
| 6,072,774 | A | 6/2000 | Natarajan et al. |
| 6,101,181 | A | 8/2000 | Passint et al. |
| 6,128,277 | A * | 10/2000 | Bruck et al. ............... 370/221 |
| 6,145,028 | A | 11/2000 | Shank et al. |
| 6,151,299 | A | 11/2000 | Lyon et al. |
| 6,157,962 | A | 12/2000 | Hodges et al. |
| 6,167,502 | A | 12/2000 | Pechanek et al. |
| 6,260,120 | B1 * | 7/2001 | Blumenau et al. ........... 711/152 |
| 6,295,575 | B1 * | 9/2001 | Blumenau et al. ............. 711/5 |
| 6,330,435 | B1 | 12/2001 | Lazaraq et al. |
| 6,338,129 | B1 | 1/2002 | Pechanek et al. |
| 6,370,145 | B1 | 4/2002 | Dally et al. |
| 6,405,185 | B1 * | 6/2002 | Pechanek et al. ............. 706/41 |
| 6,421,711 | B1 * | 7/2002 | Blumenau et al. ........... 709/213 |
| 6,434,637 | B1 | 8/2002 | DErrico |
| 6,493,825 | B1 * | 12/2002 | Blumenau et al. ........... 713/168 |
| 6,502,162 | B2 * | 12/2002 | Blumenau et al. ............. 711/5 |
| 6,567,378 | B1 | 5/2003 | Yuan et al. |
| 6,658,478 | B1 | 12/2003 | Singhal et al. |
| 6,718,428 | B2 | 4/2004 | Lee et al. |
| 6,741,561 | B1 * | 5/2004 | Lee ............................. 370/230 |

FOREIGN PATENT DOCUMENTS

| | | |
|---|---|---|
| EP | 439 693 | 8/1991 |
| EP | 550 853 | 12/1992 |
| EP | 646 858 | 8/1994 |
| EP | 669 584 | 2/1995 |
| EP | 0 785 512 | 7/1997 |
| WO | 92/06436 | 4/1992 |
| WO | 94/12939 | 6/1994 |
| WO | 99/17217 | 4/1999 |
| WO | 99/26429 | 5/1999 |
| WO | 99/63442 | 12/1999 |
| WO | 00/14932 | 3/2000 |
| WO | 02/50682 | 6/2002 |
| WO | 02/50683 | 6/2002 |

OTHER PUBLICATIONS

Bradley Kuszmaul, Mercury Computer Systems, Inc., "The RACE Network Architecture," (posted at www.mc.com/techlit/#tech_brief prior to this), 6 pages.

R.Y. Wang, T.E. Anderson and D.A. Patterson, "Virtual Log Based File Systems For a Programmable Disk," Proc. Third Symposium on Operating Systems Design and Implementation, Feb. 1999 (Also appeared as University of California Technical Report CSD-98-1031, 16 pages.

Prasant Mohapatra, Wormhole Routing Techniques for Directly Connected Multicomputer Systems, ACM Computing Surveys, vol. 30, No. 3, Sep. 1998, 37 pages.

Christopher Glass and Lionel Ni, "The Turn Model for Adaptive Routing," Journal of the Association for Computing Machinery, vol. 41, No. 5, Sep. 1994, pp. 874-902.

Reddy, Dept. of Computer & Information Sciences, "A Dynamically Reconfigurable WDM LAN Based on Reconfigurable Circulant Graph," IEEE, 1996, 4 pages.

Various Abstracts beginning with Funahashi, Jouraku and Amano, "Adaptive Routing for Recursive Diagonal Torus," Transactions of the Institute of Electronics, Information and Communication Engineers D-I, vol. J83D-I, No. 11, Nov. 2000, pp. 1143-1153.

Milan Kovacevic, Center for Telecommunications Research, "On Torus Topologies with Random Extra Links," IEEE 1996, pp. 410-418.

Dally, et al., The Torus Routing Chip, Distributed Computing, Springer-Verlag 1986, pp. 187-196.

Susan Hinrichs, "A Compile Time Model for Composing Parallel Programs," IEEE Parallel and Distributed Technology, 1995, 19 pages.

"Cray T3D System Architecture Overview Manual," ftp://ftp.cray.com/product-info/mpp/T3D_Architecture_Over/T3D.overview.html, Cray Research, 1993, 40 pages.

Marco Fillo, et al., "The M-Machine Multicomputer," Laboratory for Computer Science, Massachusetts Institute of Technology, A.I. Memo No. 1532, Ann Arbor,. Mar. 1995, 14 pages.

Noakes, et al., "The J-Machine Multicomputer: An Architectural Evaluation," Proceedings of the 20th International Symposium on Computer Architecture, May 1993, 12 pages.

Dally, et al., "Architecture of a Message-Driven Processor," International Conference on Computer Architecture, Jun. 1987, pp. 189-196.

Dennison, Lee and Dally, "High-Performance Bidirectional Signalling in VLSI," Massachusetts Institute of Technology, Oct. 12, 1992, 20 pages.

Dally, et al., "Architecture and Implementation of the Reliable Router," Mass. Institute of Technology, Proceedings of the Hot Interconnects II, Stanford CA, Aug. 1994, 12 pages.

Dally, et al., "The Reliable Router: A Reliable and High-Performance Communication Substrate for Parallel Computers," Proceedings of the First International Parallel Computer Routing and Communication Workshop, Seattle WA, May 1994, 15 pages.

Dennison, et al., "Low-Latency Plesiochronous Data Retiming," Mass. Institute of Technology, Proceedings of the 1995 Advanced Research in VLSI Conference, Chapel Hill NC, Mar. 1995, 12 pages.

Whay S. Lee, "Mechanism for Efficient, Protected Messaging," Massachusetts Institute of Technology, Dept. of Electrical Engineering and Computer Science, Jan. 20, 1999, 147 pages.

Dennison, "Reliable Interconnect Networks for Parallel Computers," Mass. Institute of Technology, Dept. of Electrical Engineering and Computer Science, Apr. 18, 1991, 79 pages.

Thucydides Xanthopoulos, "Fault Tolerant Adaptive Routing in Multicomputer Networks," Dept. of Electrical Engineering and Computer Science, Mass. Institute of Technology, Jan. 20, 1995, 152 pages.

Dennison, "The Reliable Router: An Architecture for Fault Tolerant Interconnect," Dept. of Electrical Engineering and Computer Science, Mass Institute of Technology, May 24, 1996, 145 pages.

"Introduction To Parallel Algorithms and Architectures: Arrays, Trees, Hypercubes," F. Thomson Leighton, Morgan Kaufmann Publishers, 1992, pp. 1-831.

Christopher J. Glass and Lionel Ni, "Fault-Tolerant Wormhole Routing in Meshes," Technical Report, MSU-CPS-ACS-72, Oct. 30, 1992 (revised May 25, 1993), 28 pages.

Stefan Savage and John Wilkes, "AFRAID-A Frequently Redundant Array of Independent Disks," Proceedings of the 1996 USENIX Technical Conference, pp. 27-39, San Diego, CA, Jan. 1996, 13 pages.

Steve Ward, et al., "A Modular, Scalable Communications Substrate," MIT Laboratory for Computer Science, Jul. 1993, 10 pages.

Christopher Glass and Lionel Ni, "The Turn Model for Adaptive Routing," Technical Reports, MSU-CPS-ACS-44, Oct. 10, 1991 (revised Mar. 2, 1992), pp. 278-287 (numbered herein as 1-20).

Thomas Stricker, "Message Routing on Irregular 2D-Meshes and Tori," School of Computer Science, Carnegie Mellon Univ., Jan. 15, 1991, pp. 170-177 (numbered herein as 1-19).

Dally, et al., "The J-Machine: A Restropective," in 25 Years of the International Symposia on Computer Architecture—Selected Papers. pp. 54-58, 1998.

International Search Report for PCT/US 01/47891, mailed Jul. 16, 2002.

G. Albertengo, et al., "Optimal Routing Algorithms for Bidirectional Manhattan Street Network," IEEE, 1991, 3 pages.

"A Routing Protocol for Finding Two Node-Disjoint Paths in Computer Networks," Ishida, et al., IEEE, 1995, pp. 340-347.

Cisco Systems Glossary Tool, Routing Table: Technical Definition, 1999-2002, Cisco Systems.

* cited by examiner

HIGH PERFORMANCE STORAGE ARRAY INTERCONNECTION FABRIC USING MULTIPLE INDEPENDENT PATHS

BACKGROUND OF THE INVENTION

1. Field of the Invention

This invention relates to data storage systems and, more particularly, to storage array interconnection topologies.

2. Description of the Related Art

Computer systems are placing an ever-increasing demand on data storage systems. In many of the data storage systems in use today, data storage arrays are used. The interconnection solutions for many large storage arrays are based on bus architectures, such as small computer system interconnect (SCSI) or fibre channel (FC). In these architectures, multiple storage devices such as disks, may share a single set of wires, or a loop in the case of FC, for data transfers.

Such architectures may be limited in terms of performance and fault tolerance. Since all the devices share a common set of wires, only one data transfer may take place at any given time, regardless of whether or not all the devices have data ready for transfer. Also, if a storage device fails, it may be possible for that device to render the remaining devices inaccessible by corrupting the bus. Additionally, in systems that use a single controller on each bus, a controller failure may leave all the devices on its bus inaccessible.

There are several existing solutions available, which are briefly described below. One solution is to divide the devices into multiple subsets utilizing multiple independent buses for added performance. Another solution suggests connecting dual buses and controllers to each device to provide path fail-over capability, as in a dual loop FC architecture. An additional solution may have multiple controllers connected to each bus, thus providing a controller fail-over mechanism.

In a large storage array, component failures may be expected to be fairly frequent. Because of the higher number of components in a system, the probability that a component will fail at any given time is higher, and accordingly, the mean time between failures (MTBF) for the system is lower. However, the above conventional solutions may not be adequate for such a system. To illustrate, in the first solution described above, the independent buses may ease the bandwidth constraint to some degree, but the devices on each bus may still be vulnerable to a single controller failure or a bus failure. In the second solution, a single malfunctioning device may still potentially render all of the buses connected to it, and possibly the rest of the system, inaccessible. This same failure mechanism may also affect the third solution, since the presence of two controllers does not prevent the case where a single device failure may force the bus to some random state.

SUMMARY

Various embodiments of a high performance storage array interconnection fabric using multiple independent paths are disclosed. In one embodiment, a storage system including a plurality of communication paths configured for connecting each node of a plurality of nodes forming an interconnection fabric is disclosed. Each of the communications paths is an independent communications path. In addition, a first portion of the plurality of nodes is configured to communicate with a plurality of mass storage devices such as disk drives. In other embodiments, the mass storage devices may be random access memories configured as cache memories or tape drives. A second portion of the plurality of nodes may be configured to communicate with a host.

In some embodiments, each node of the plurality of nodes may be configured to communicate with each other node of the plurality of nodes by routing messages bi-directionally. In an alterative embodiment, each node of the plurality of nodes is configured to communicate with each other node of the plurality of nodes by routing messages uni-directionally.

In another embodiment, a method of interconnecting a plurality of nodes is recited. In one embodiment, each node is connected to each other node using a plurality of communications paths. The communications paths and the nodes form an interconnection fabric. Each of the communications paths is an independent communications path. Additionally, a first portion of the plurality of nodes is configured to communicate with a plurality of mass storage devices.

In an embodiment, a method for routing communications within a storage system comprising a plurality of nodes interconnected by an interconnection fabric is recited. In one embodiment, a communication from a source node is sent to a destination node using a first communication path. A failure in the first communication path may be detected. The communication from the source node may be resent to the destination node using a second communication path, which is independent from the first communication path.

Figure 1:
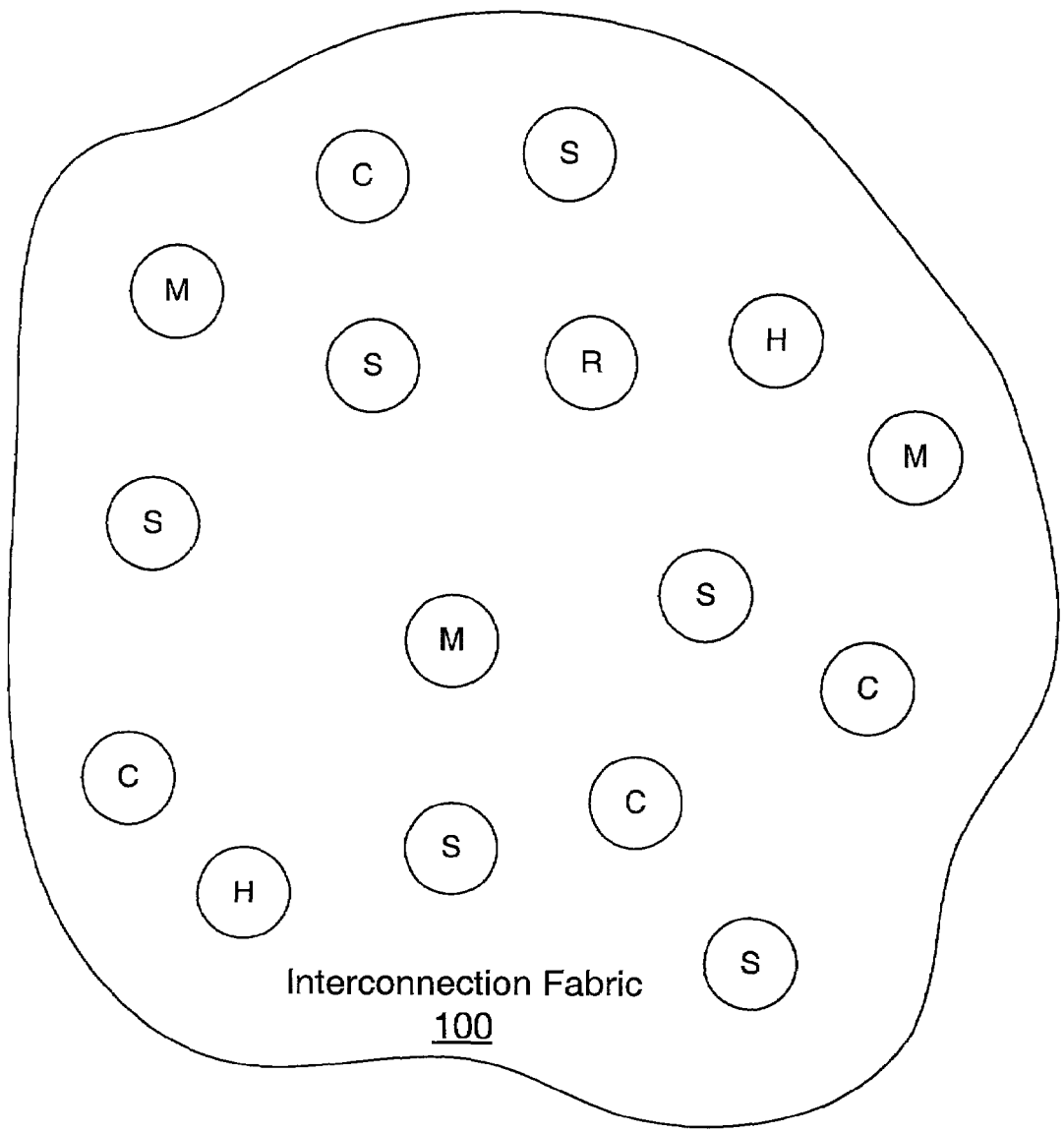
FIG. 1 is a diagram of one embodiment of an interconnection fabric using multiple independent paths.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a diagram of one embodiment of an interconnection fabric using multiple independent paths is shown. An interconnection fabric 100 is shown with several nodes. Each node may support one or more different types of devices in a storage system. The nodes are labeled with the letters C, H, M, R and S. A node with the letter C means the node may be configured to support a controller such as a Redundant Array of Inexpensive Disks (RAID) controller. A node with the letter H means the node may be configured with a host interface or line card that may serve as an interface to a host computer. A node with the letter R means the node may be configured as a routing node and merely expands the communication paths available between other nodes. A node with the letter S means the node may be configured as a mass storage node and may be connected to one or more mass storage devices, such as hard disk drives. A node with the letter M means the node may be configured as a storage cache memory node that provides, for example, a hierarchical storage cache for one or more mass storage nodes. Also, nodes may support any combination of these features. It is noted that while the nodes are configured and labeled in the embodiment of FIG. 1, this is only an exemplary drawing. In other embodiments, there may be other configurations that have a fewer or greater number of nodes and the nodes may be configured and used differently. For example, there may be a fewer or greater number of S nodes and a fewer or greater number of H nodes.

Generally speaking, each node may be connected to each other node in the fabric by multiple communication paths (not shown in FIG. 1). The communication paths form the fabric such that each communication path may be completely independent of each other path. Therefore, each node may have multiple possible paths to use when communicating with another node. Multiple independent paths may allow a source node and a destination node to continue communicating with each other even if one or more communications paths or nodes between the source and destination nodes becomes inoperative. The interconnect fabric may be a point-to-point interconnect between each node, in which multiple independent paths exist between a source node and a destination node. In one embodiment, every node has multiple independent paths to communicate with every other node. The path independence of the fabric may allow a node or a path to fail or experience adverse conditions (e.g. congestion) without affecting any other node or path.

The figures that follow will describe an embodiment of a node of interconnection fabric 100 and some exemplary diagrams of possible forms that interconnection fabric 100 may take.

Figure 2:
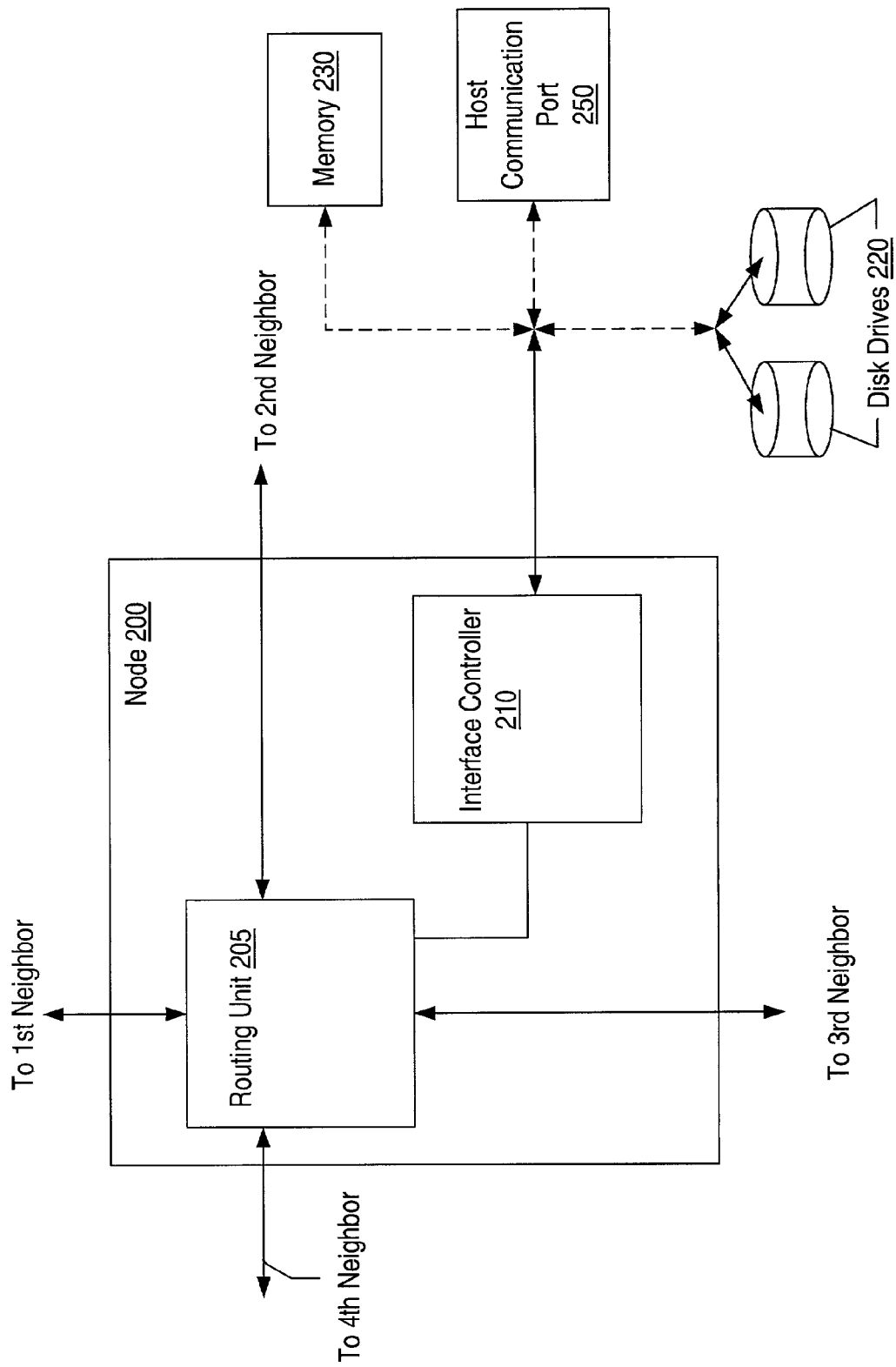
FIG. 2 is a block diagram a node of an interconnection fabric, according to one embodiment.

Turning now to FIG. 2, a block diagram of one embodiment of a node of the interconnection fabric of FIG. 1 is shown. In FIG. 2, a node 200 includes a routing unit 205 coupled to an interface controller 210. Routing unit 205 may be configured to communicate through multiple ports. In one particular embodiment, there may be four ports and the ports may be bi-directional. Thus, routing unit 205 may communicate with four neighboring nodes allowing four independent routing paths. In one alternative embodiment, routing unit 205 may be configured with four uni-directional ports: two inputs and two outputs. The choice between using bi-directional and unidirectional ports may be influenced by competing factors. The unidirectional design may be simpler, but it may only tolerate a single failure of a neighboring node. The bi-directional design tolerates more failures but may require a more complex routing unit 205. The size of the storage system array may be a determining factor, since for a very large number of storage devices, a three-fault tolerant bi-directional fabric may become desirable to attain a reasonably low MTBF.

In addition to the nodes communicating with other nodes, in one embodiment, interface controller 210 may be configured to communicate with one or more disk drives 220. In another embodiment, interface controller 210 may be configured to communicate with one or more random access memories 230, such as a hierarchical storage cache memory or other type of memory and a memory controller. In yet another embodiment, interface controller 210 may be configured to communicate with a host or a RAID controller through a communication port, such as a peripheral component interface (PCI) bus. It is also contemplated that interface controller 210 may have all of these functions or any combination of the above described functions. For example, interface controller 210 may be configurable for selecting between any one of the different types of interfaces described above. Thus, the ability to communicate with and/or control storage devices and communicate to hosts in an interconnection fabric may advantageously increase the reliability, performance and flexibility of large storage systems.

It is further contemplated that interface controller 210 may not have any devices attached. In such an embodiment, node 200 may simply connect to neighbors through routing port 205. Thus, node 200 may be used in the interconnection fabric of FIG. 1 to increase the number of possible communications paths available. Therefore, some nodes may be unpopulated with storage or other devices, and used as a routing node to increase the number of paths in the interconnection fabric. Although it is contemplated that the above described node embodiments may be used in the following figures when nodes are discussed, there may be other embodiments of the nodes which are modifications of the above described node embodiments.

Figure 3A:
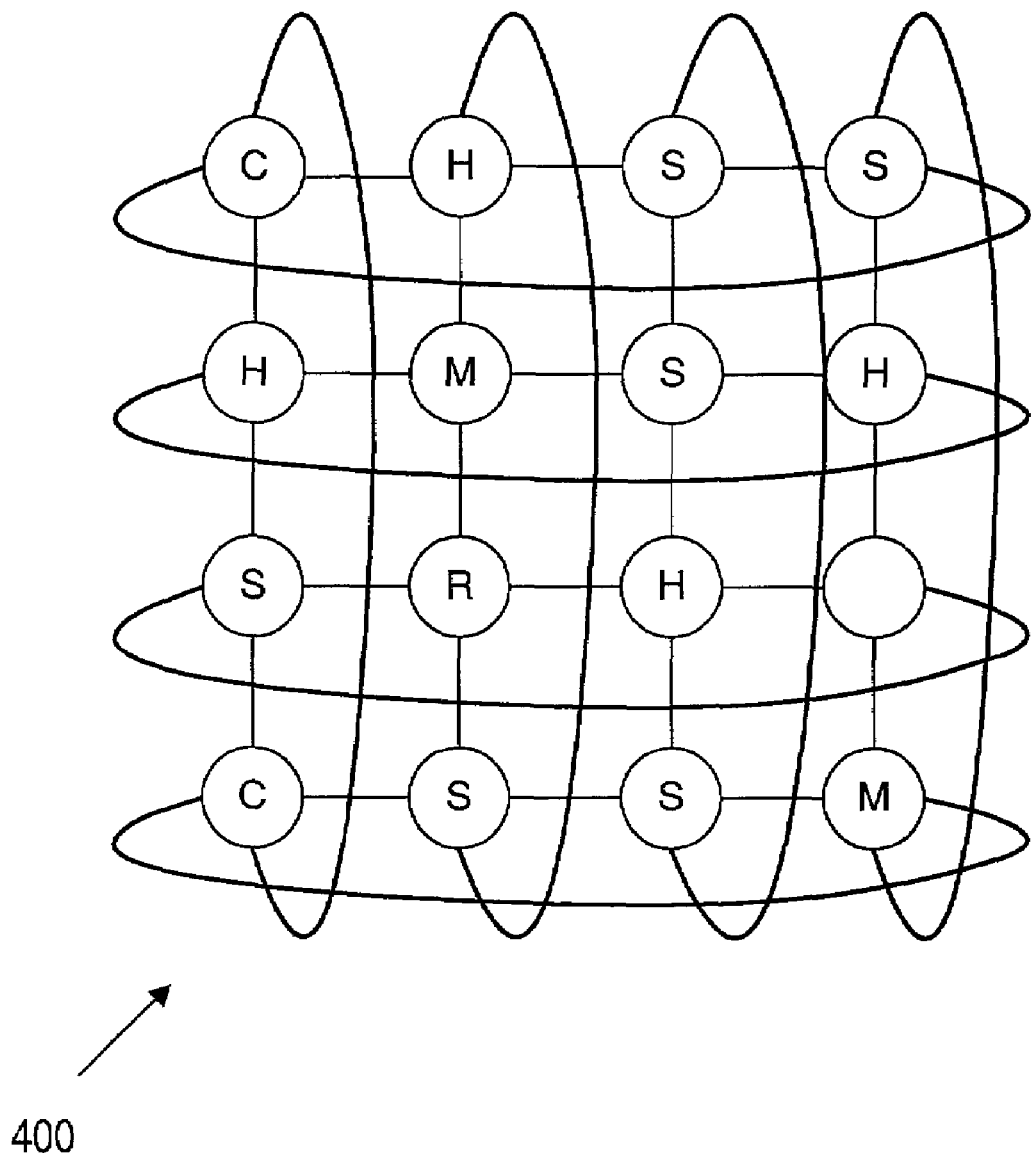
FIG. 3A is a diagram of one embodiment of a torus interconnection fabric.

Referring to FIG. 3A, a diagram of one embodiment of a torus interconnection fabric is shown. A torus fabric 400 may be employed as the interconnection fabric depicted in FIG. 1. In FIG. 3A, torus fabric 400 uses a two-dimensional (2-D) array topology with the beginning nodes of each row and column connected to the respective endpoints of each row and column. For example, if the 2-D array is an N by M array, where N and M are both positive integers, then the first node in row one would be connected to the last node in row one, in addition to all the other nodes neighboring the first node. Likewise, from a column perspective, the top node in column one is connected to the bottom node in column one in addition to all the other nodes neighboring the top node. The remaining nodes are connected in similar fashion such that every node in the fabric of torus 400 is connected to its four neighboring four nodes. It is noted that torus 400 is shown as a flat two-dimensional array with longer connections between the endpoints. These may be logical connections, and the physical layout of the nodes may be different. For example, each row may be physically oriented in the shape of a ring, such that the distance from the last node to the first node may be nearly the same as the distance between all the other nodes and likewise for the columns.

The level of interconnection described above for a torus interconnect fabric means that in one embodiment each node may have four ports with which to communicate to the other nodes. In one embodiment, each of the four ports is a bi-directional port, thus allowing both inputs and outputs from each neighbor. In an alternative embodiment, each of the four ports is a uni-directional port, thus allowing two inputs and two outputs. Thus, torus 400 may provide an interconnection fabric with multiple independent paths for a storage device system.

Although the above torus 400 is described using a two-dimensional array, it is contemplated that this same fabric may be extended to include a multi-dimensional array beyond two dimensions (not shown). One embodiment of a three dimensional array may include several two-dimensional arrays "stacked" or layered such that each node now has six neighboring nodes instead of four and each layer is connected together using the two additional ports.

In an additional embodiment, torus 400 may be reduced to a mesh (not shown). A mesh, like torus 400, may be logically arranged in either a 2D or 3D array. However a mesh does not have the wrap around connections that the torus has, which connect the row and column endpoints together. Although the mesh does have multiple independent paths with which the nodes may communicate, not all the nodes have the same number of multiple independent paths.

Figure 3B:
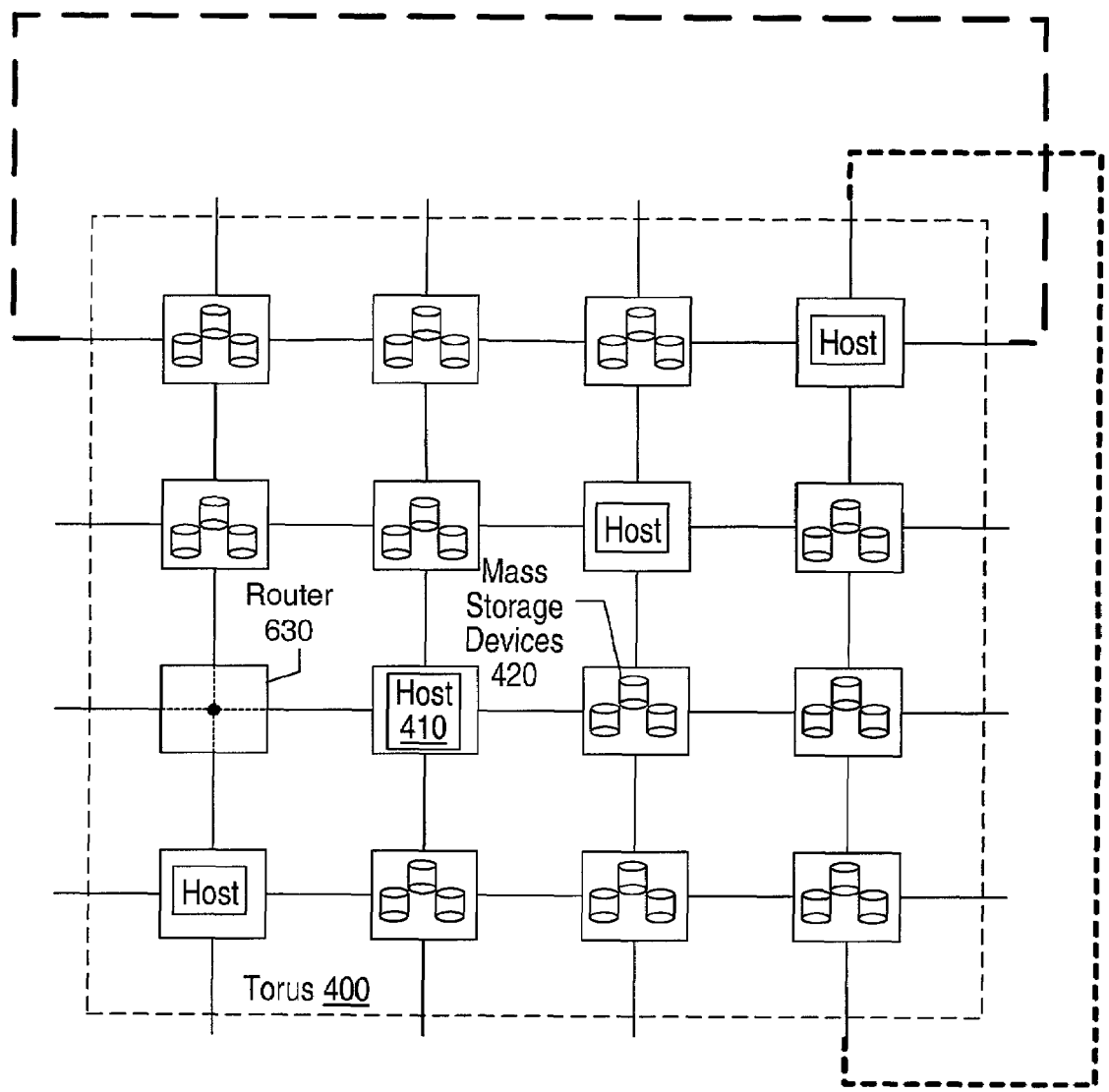
FIG. 3B is a diagram of one embodiment of a node configuration of a torus interconnection topology.

Referring now to FIG. 3B, a diagram of one embodiment of a node configuration of a torus interconnection topology is shown. The torus topology 400 of FIG. 3A is shown here with some of the interconnections not shown for clarity. In torus 400 of FIG. 3B, a portion of the nodes is shown comprising storage devices, such as storage devices 420. In one embodiment, storage devices 420 may be disk drives. Another portion of the nodes are shown with host blocks in them, such as host 410. Host 410 may be a host communication port or line card. Other nodes, such as router node 630, may include a routing unit to expand the interconnect paths but may not include a device such as a disk drive or host interface. Thus, a storage system may include a plurality of nodes connected together by an interconnect fabric such as a torus fabric. The interconnect fabric may provide multiple independent point-to-point communication paths between nodes sending communications and nodes receiving the communications. A portion of the node may include mass storage devices such as hard drives. Other nodes may include storage controllers or host interfaces. In general, a mass storage system may be provide by the plurality of nodes and interconnect paths. The multiple independent paths between nodes may provide failover redundancy and/or increased bandwidth for communications between source and destination nodes. As mentioned above, many large storage systems use a large number of disks. To reduce costs, inexpensive and smaller disks may be used. However, since more disks may increase the failure rate, a highly redundant interconnection fabric, such as torus 400 may be used to provide a reliable overall system. For example, a storage controller node may send a write command and write data to a storage node having one or more hard drives. If the first path chosen for the write command fails, the command may be resent on a second path.

Additionally, the multiple paths of the torus interconnect allow for multiple parallel communications and/or disk operations that may be initiated over different paths, thereby possibly increasing the bandwidth and performance of the storage system. In a torus storage system with multiple controllers/host attachments, many parallel paths may exist between the hosts and the disks. Thus, many disk operations may be issued at the same time, and many data transfers may take place concurrently over the independent paths. This concurrency may provide a performance advantage and more scalability over bus-based architectures in which multiple devices must take turns using the same wires/fibre.

It is noted that other embodiments may use fewer or more storage devices 420 and fewer or more host 410 nodes to facilitate cost and performance tradeoffs. In addition, and as mentioned above, it is contemplated that some nodes may be configured to communicate with RAID controllers, and/or storage cache memory.

The torus fabric is just one example of a multiple path independent interconnect that may provide improved reliability and performance, as described above. Other examples are described below.

Figure 4:
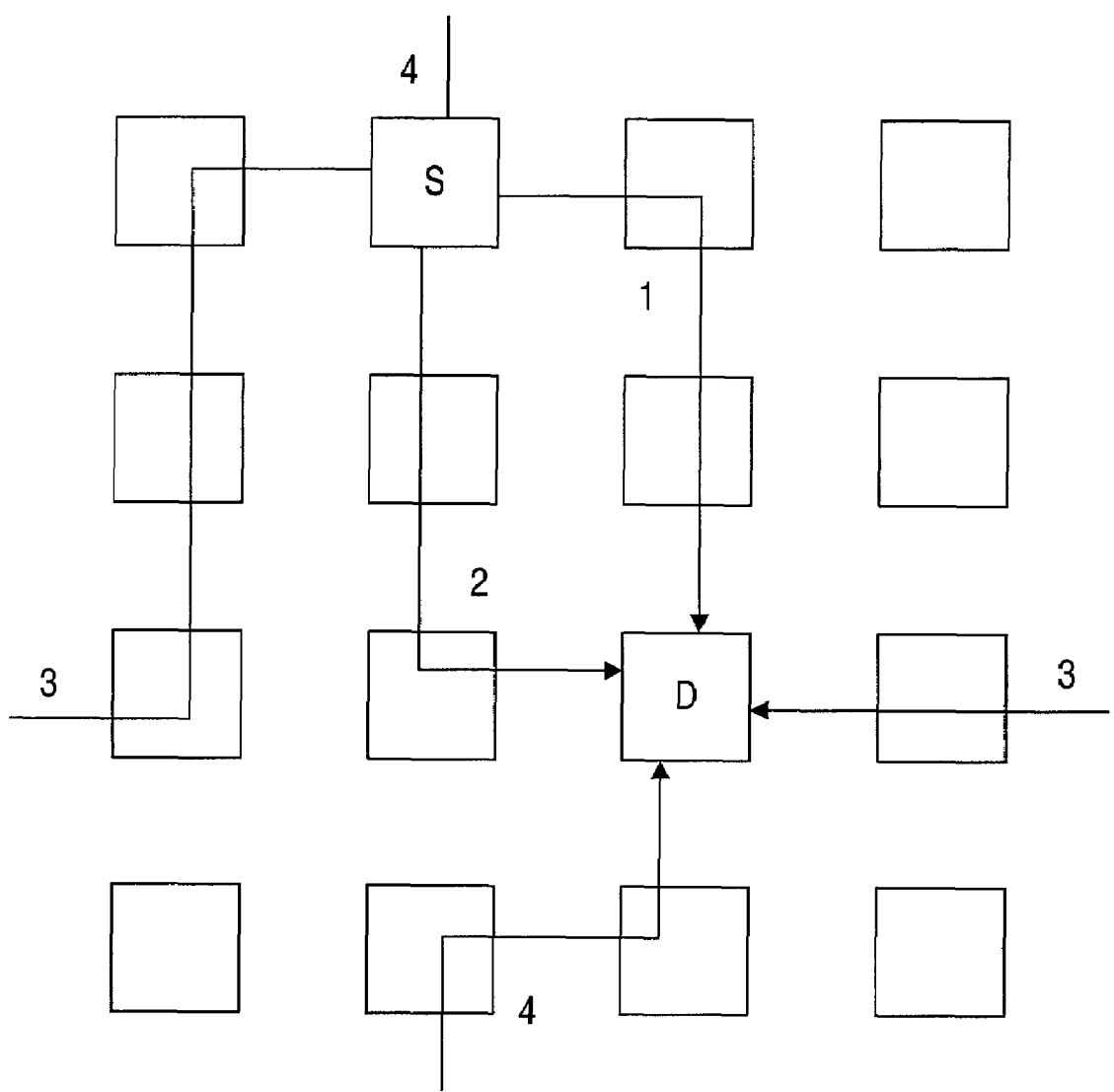
FIG. 4 is a diagram illustrating multiple independent paths between nodes in a system having a plurality of nodes connected by a multiple independent path interconnection fabric, according to an embodiment.

Turning now to FIG. 4 a plurality of nodes connected by an interconnection fabric using multiple independent paths is illustrated. No particular interconnect fabric scheme is shown since various different multiple independent path interconnects may be employed. In one embodiment, the nodes are connected by a torus fabric. FIG. 4 shows one possible combination of four independent paths from source node S to destination D. Many other combinations of such redundant paths are possible. Note that each path may traverse multiple intermediate nodes between the source and destination.

Figure 5:
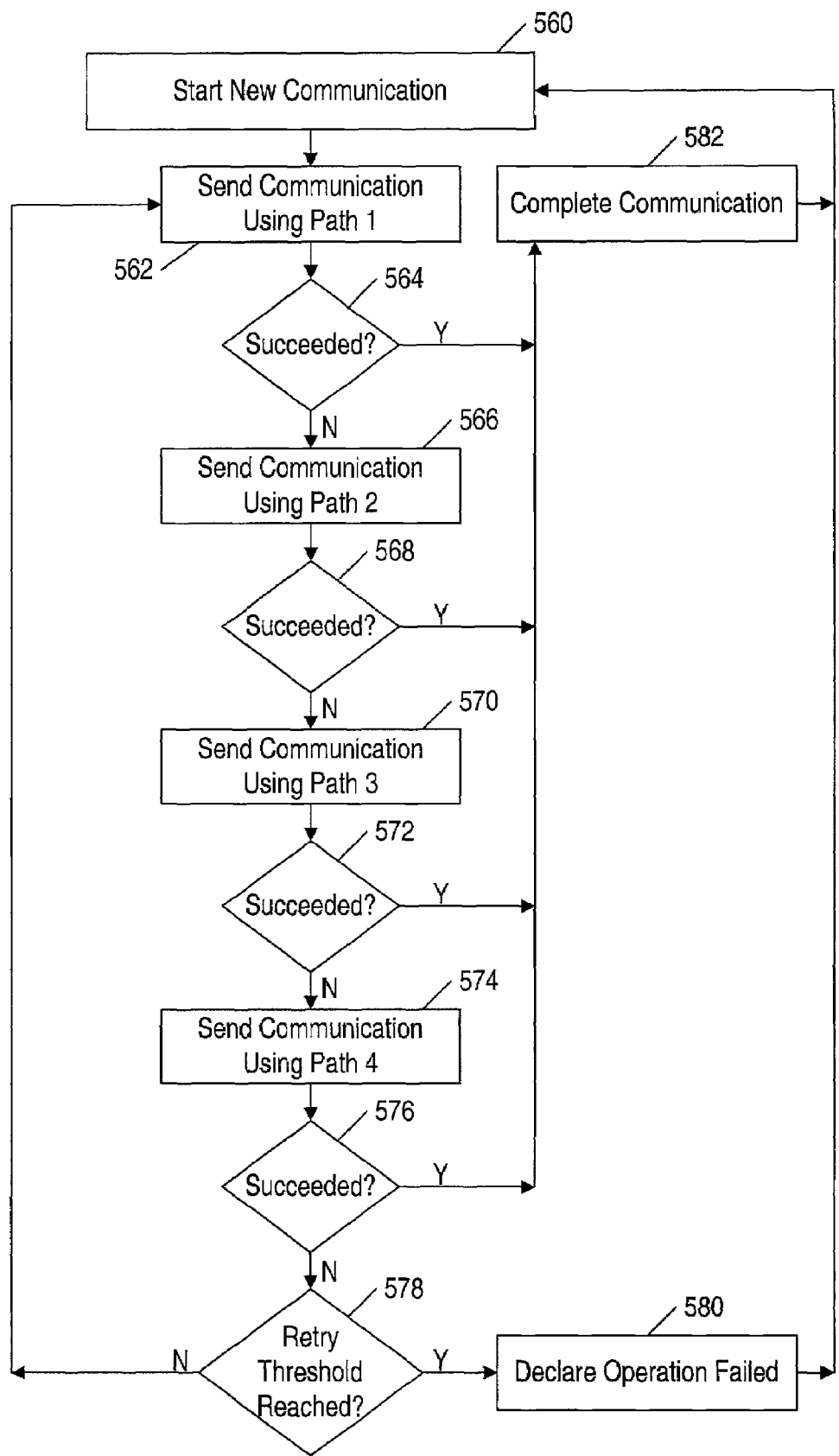
FIG. 5 is a flow diagram of a method for routing communications between nodes in a multiple independent interconnection fabric, according to an embodiment.

Referring now to FIG. 4 and FIG. 5 together, a method is illustrated for routing communications within a multiple independent path interconnect fabric. A new communication may begin at source node S, as indicated at 560. To communicate with destination node D, source node S may attempt to use path 1, as indicated at 562. If the attempt succeeds, the communication event is completed, as indicated at 564 and 582. The attempt may fail due to various conditions in the path, including a failure in an intermediate node, congestion etc. If the attempt fails, the source node S retries the communication through path 2, as indicated at 564 and 566. If that also fails, source node S tries path 3, as indicated at 568 and 570, and the if that fails too, path 4 may be tried, as indicated at 572 and 574. After all of the paths have been tried without success, the source node S may optionally decide to return to path 1 and repeat the entire procedure again, as indicated at 578. In one embodiment, if the failure persists after some number of such repeated attempts, the source node may declare the destination node unreachable, and fail the operation completely, as indicated at 580.

Figure 6:
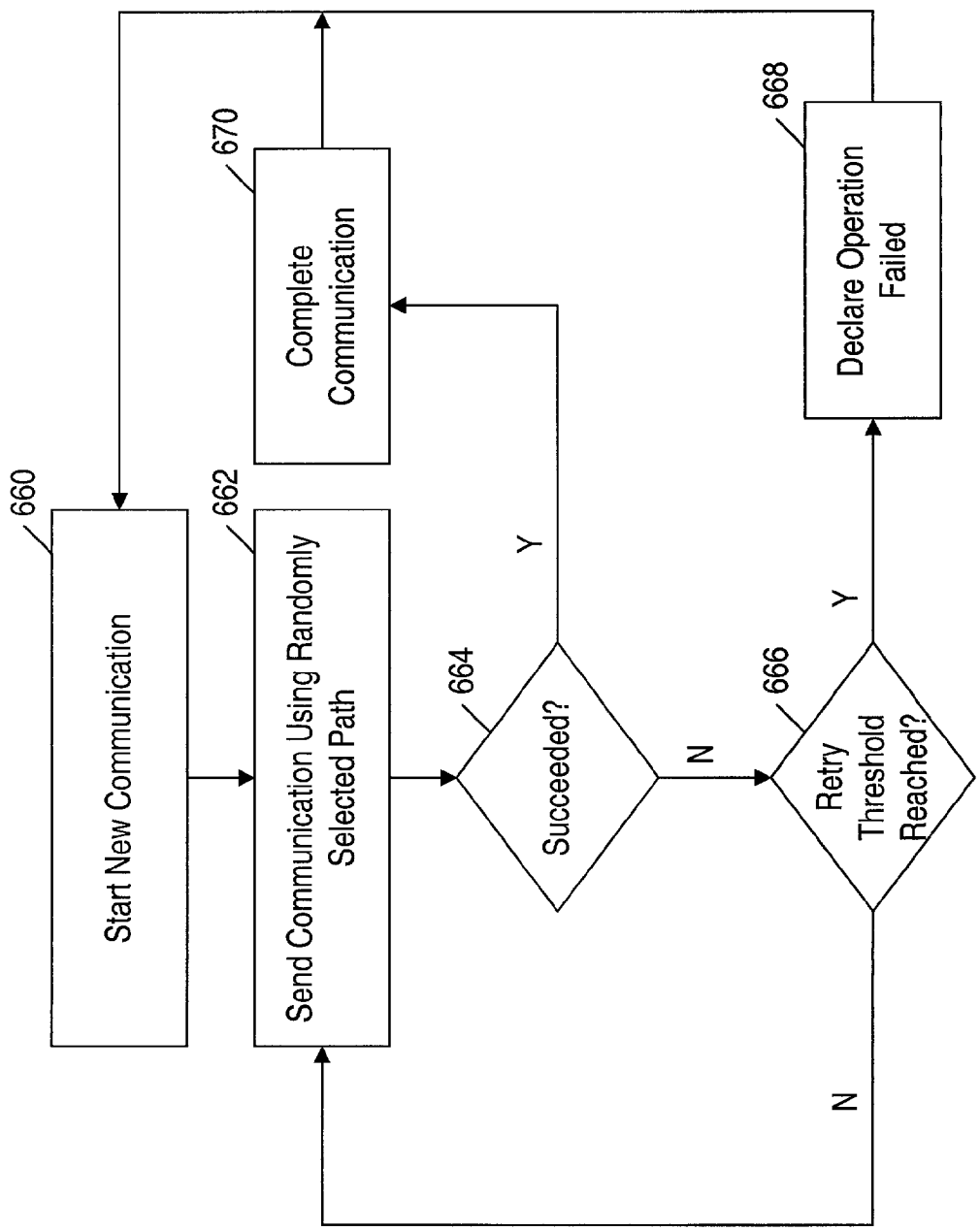
FIG. 6 is a flow diagram of another method for routing communications between nodes in a multiple independent interconnection fabric, according to an embodiment.

FIG. 6 shows another approach for routing communications within a multiple independent path interconnect fabric. A communication may begin at source node S, as indicated at 660. Instead of sequentially trying path 1 through 4 (e.g., as in FIG. 5), the source node S may choose randomly from the possible paths 1 through 4, as indicated at 662. Source node S may retry until the operation is successful, as indicated at 664 and 670, or until the threshold is exceeded, upon which the destination is declared unreachable, as indicated at 666 and 668. Other path selection algorithms are also contemplated, such as a scheme in which paths are chosen by the source node according to a weighted preference assigned to each independent path from the source node to the destination node.

In the embodiments described in regard to FIG. 5 and FIG. 6, the intermediate nodes (e.g. those making up the path from S to D) may not make any decisions regarding what paths to try. In some embodiments, the intermediate nodes do not have complete knowledge of the path. For example, an intermediate node may only know that some message or communication came in from one of its input ports, requesting to go out a specified one of its four output ports. The intermediate nodes may simply attempt to pass along the message or communication from the input port to the requested output port. If the attempt succeeds, the communication/message progresses to the next node, until the message reaches its destination, upon which the message is delivered to the target device. Otherwise, the path may considered bad or congested, etc. This condition may be signaled back to the source (e.g. with the cooperation of upstream intermediate nodes in the path). This path failure notification may prompt the source to select another path for the retry, e.g. according to the methods shown in FIG. 5 or FIG. 6, or other alternatives.

Figure 7:
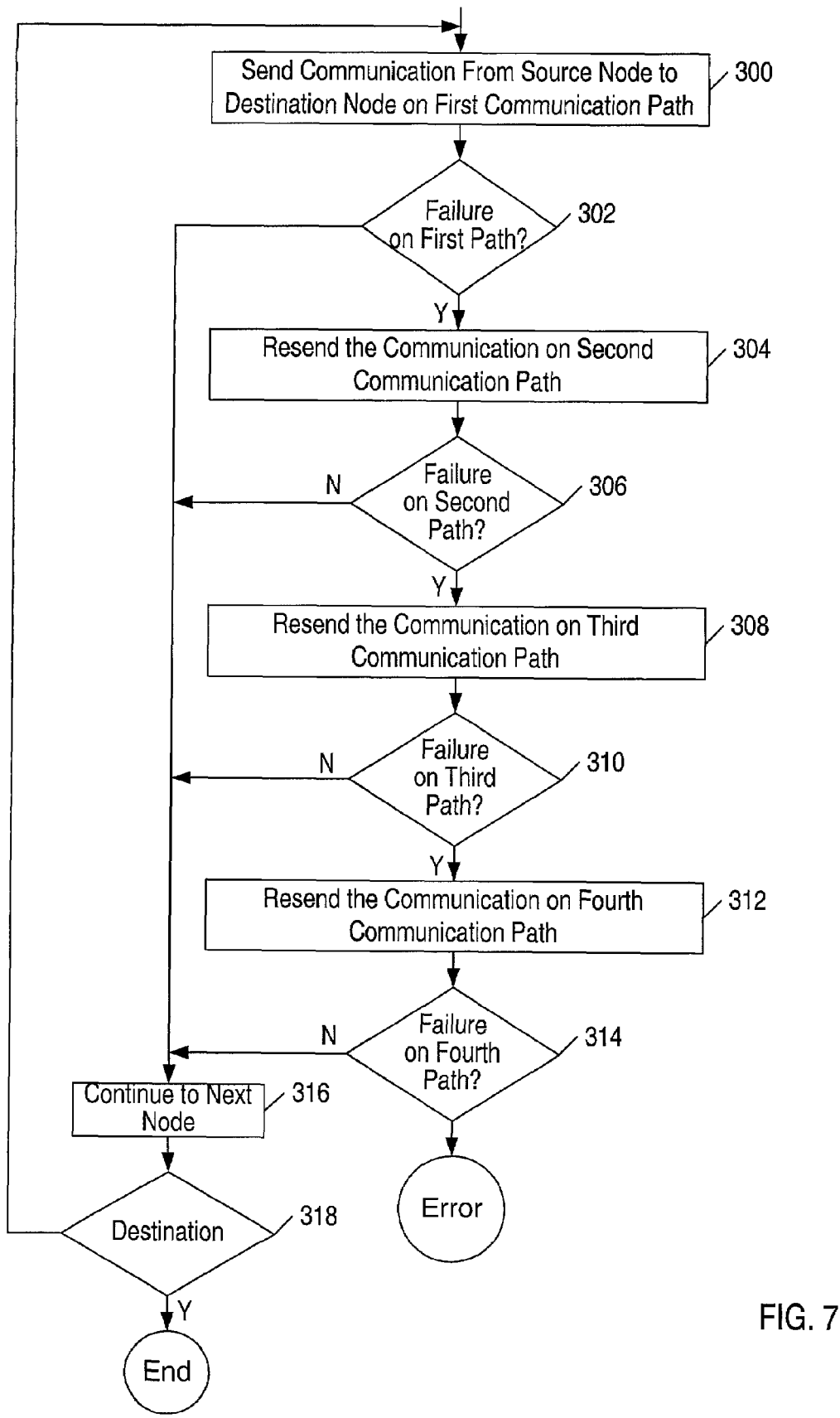
FIG. 7 is a flow diagram of another method for routing communications between nodes in a multiple independent interconnection fabric, according to an embodiment.

Turning now to FIG. 7, a method is illustrated for routing communications within an interconnect fabric between nodes in which intermediate nodes may chose alternate paths upon detection of failures or adverse routing conditions. As used herein, an adverse routing condition may be any of various conditions that may cause slow or unreliable communications. An example of an adverse routing condition may therefore be a particularly congested path or a path with transmission errors. As used herein, a failure may or may not be a hard failure. For example, a failure may be declared if a path has an adverse routing condition for an extended period.

A communication may be sent from a source node to a destination node on a first communication path as indicated at 300. A failure may or may not be detected on the first communication path from the source node as indicated at 302. If no failure is detected the communication continues on to the next node as indicated at 316. If a failure is detected the communication may be resent on a second communication path as indicated at 304. Since the interconnect fabric described above may provide multiple independent communication paths from each node, in one embodiment, this procedure may be repeated in case the second communication path and a third communication path fails as indicated at 306 through 314. If a fourth communication path fails then an error may be declared. Assuming that at least one path from the source node was working, the communication continues to the next node as indicated at 316. If the next node is a destination node then the routing process is complete as indicated at 318, otherwise the routing procedure may be repeated for the next node. Alternatively, in the event that a failure is detected at 302, 306 and 310, a message or signal may be sent back to the source node indicating the failure and the source node may then choose an alternate path. It is noted that while this embodiment describes four paths, other embodiments may have a fewer or greater number of independent paths between each node.

Figure 8A:
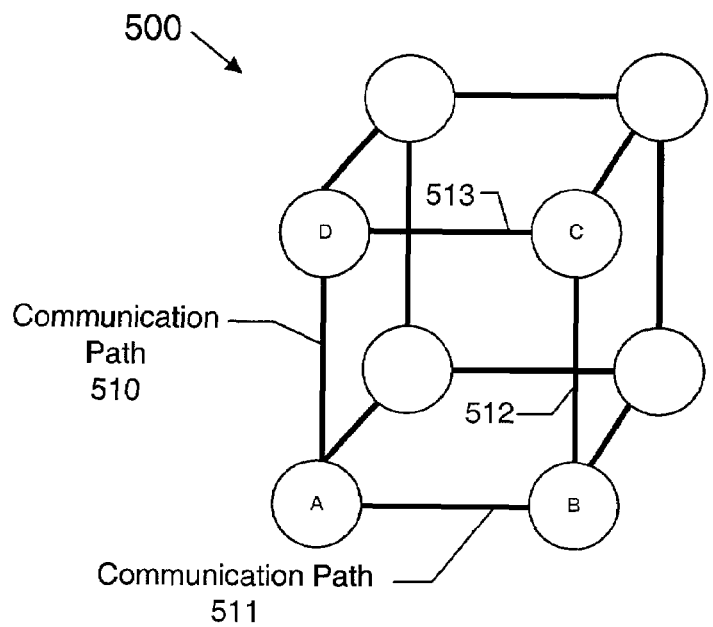
FIG. 8A is a diagram of one embodiment of a hypercube interconnection fabric.

Turning now to FIG. 8A, a diagram of one embodiment of a hypercube interconnection fabric is shown. A hypercube 500 may be employed as the interconnection fabric depicted in FIG. 1. In FIG. 8A, hypercube 500 has 8 nodes. Each node in hypercube 500 is connected to 3 neighboring nodes by three independent communications paths. Similar to the interconnection fabric shown in FIG. 1 and the torus interconnection fabric of FIG. 3A and FIG. 3B, the nodes of hypercube 500 of FIG. 8A may also be configured to control or be connected to devices such as hard disks, cache memories, RAID controllers and host communications interfaces.

In general, a hypercube may be thought of as a structure with 2 to the power of n nodes. Hypercube 500 may be created, for example, by starting with a rectangle containing four nodes (e.g. a $2^2$ hypercube). To expand the structure, the 4 nodes are duplicated and connected to the existing 4 nodes forming hypercube 500, which is a $2^3$ hypercube. The nodes in the duplicated structure are connected to the nodes in the existing structure that are in the same location in the structure. Additionally, the value of the exponent 'n' may also identify the number of independent paths connected to each node.

Thus, if a node or communication path fails, another path may be used to communicate. For example, node A of FIG. 8A is communicating with node D via a communication path 510. In the event that communication path 510 is detected as a failing path, an alternate path may be used. For example, the communication may be rerouted through the path including communication path 511, node B, communication path 512, node C and communication path 513.

Figure 8B:
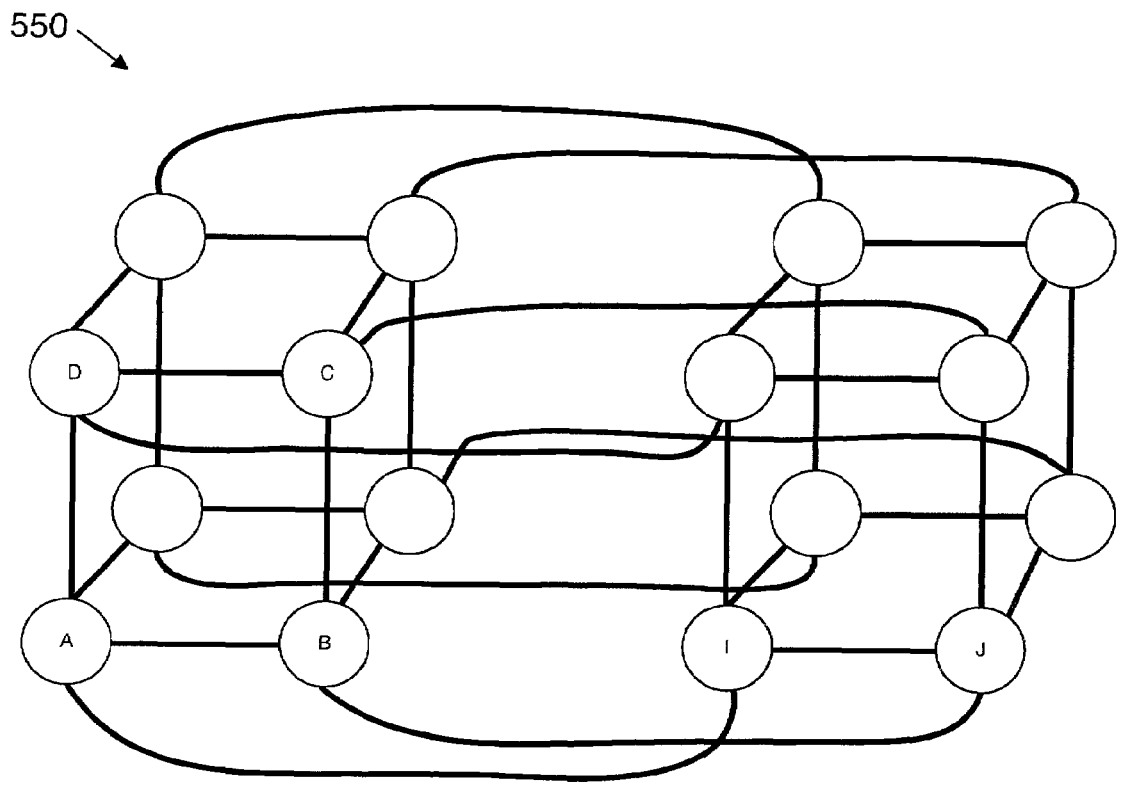
FIG. 8B is a diagram of another embodiment of a hypercube interconnection fabric.

Referring to FIG. 8B, a diagram of another embodiment of a hypercube interconnection fabric is shown. A hypercube 550 may be employed as the interconnection fabric depicted in FIG. 1. In FIG. 8B, hypercube 550 has 16 nodes. Hypercube 550 is an example of a $2^4$ hypercube. Each node in hypercube 550 is connected to 4 neighboring nodes by 4 independent communications paths. Thus hypercube 550 is also an interconnection fabric with multiple independent communication paths. Similar to the hypercube described in FIG. 8A, the nodes of hypercube 550 of FIG. 8B may also be configured to control or be connected to devices such as hard disks, cache memories, RAID controllers and host communications interfaces.

Hypercube 550 may be constructed by duplicating the $2^3$ hypercube in FIG. 8A. Each node in the original structure is connected to each node in the duplicated structure that is in the same location in the hypercube. For example, node A in FIG. 8B is connected to node I and node B is connected to node J and so on for the remaining nodes.

Additionally, the multiple paths of hypercube 500 of FIG. 8A and hypercube 550 of FIG. 8B may allow for multiple parallel communications and/or disk operations that may be initiated over different paths, thereby possibly increasing the bandwidth and performance of the storage system. In a hypercube storage system with multiple controllers/host attachments, many parallel paths may exist between the hosts and the disks. Thus, many disk operations may be issued at the same time, and many data transfers may take place concurrently over the independent paths. This concurrency may provide a performance advantage and more scalability over bus-based architectures in which multiple devices must take turns using the same wires/fibre.

Figure 9:
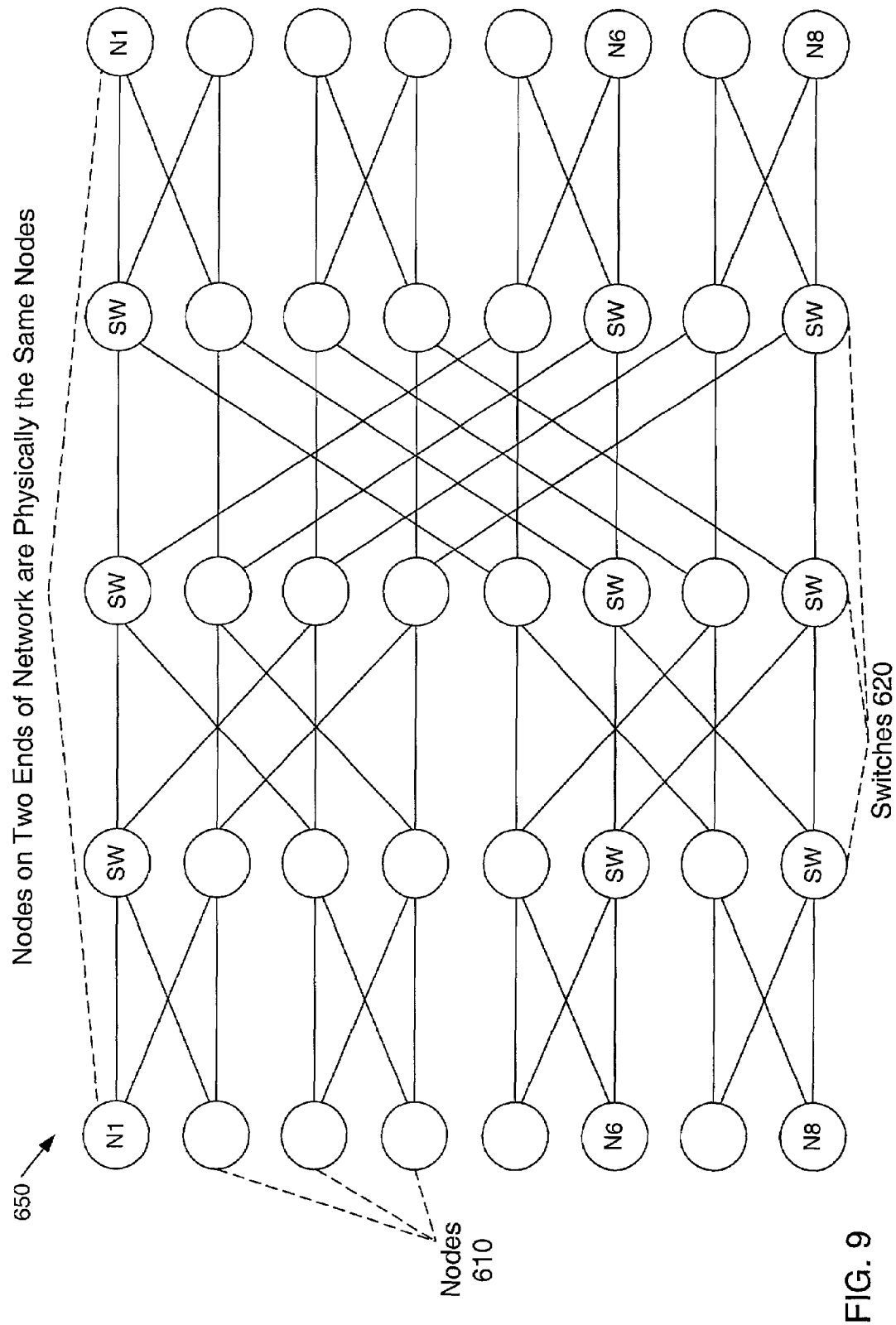
FIG. 9 is a diagram of an embodiment of a multiple path butterfly interconnection fabric.

Referring to FIG. 9, a diagram of an embodiment of a multiple path butterfly interconnection fabric is shown. A butterfly interconnection fabric 650 may be employed as the interconnection fabric depicted in FIG. 1. Butterfly interconnection fabric 650 includes nodes 610 and switches 620, which are interconnected via multiple communications paths. Similar to the interconnection fabric shown in FIG. 1 and the torus interconnection fabric of FIG. 3A and FIG. 3B and the hypercubes of FIG. 8A and FIG. 8B, nodes 610 and switches 620 of butterfly fabric 650 may communicate over multiple independent paths. Likewise, the nodes of butterfly 650 of FIG. 9 may also be configured to control or be connected to devices such as hard disks, cache memories, RAID controllers and host communications interfaces.

Butterfly interconnection fabric 650 may be referred to as a 2-path 8-node butterfly. In other embodiments, butterfly interconnection fabric 650 may be expanded into a Benes network (not shown), which is two back-to-back butterflies.

Additionally, the multiple paths of butterfly 650 of FIG. 9 may allow for multiple parallel communications and/or disk operations that may be initiated over different paths, thereby possibly increasing the bandwidth and performance of the storage system. In a butterfly storage system with multiple controllers/host attachments, many parallel paths may exist between the hosts and the disks. Thus, many disk operations may be issued at the same time, and many data transfers may take place concurrently over the independent paths. This concurrency may provide a performance advantage and more scalability over bus-based architectures in which multiple devices must take turns using the same wires/fibre.

Figure 10:
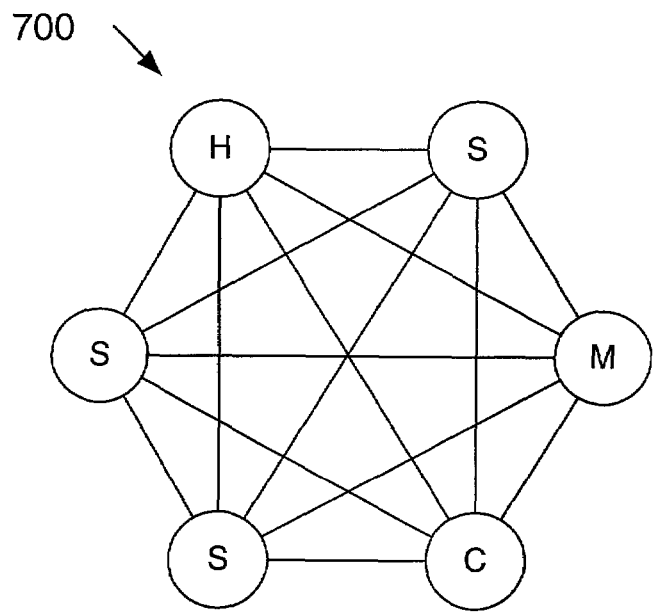
FIG. 10 is a diagram of one embodiment of a complete graph interconnection fabric.

Turning to FIG. 10, a diagram of one embodiment of a complete graph interconnection fabric is shown. A complete graph interconnection fabric 700 may be employed as the interconnection fabric depicted in FIG. 1. In FIG. 10, complete graph interconnection fabric 700 includes nodes coupled together by multiple independent communications paths. Similar to the interconnection fabrics described in the above FIGs., the nodes of complete graph interconnection fabric 700 of FIG. 10 may also be configured to control or be connected to devices such as hard disks, cache memories, RAID controllers and host communications interfaces.

Figure 11:
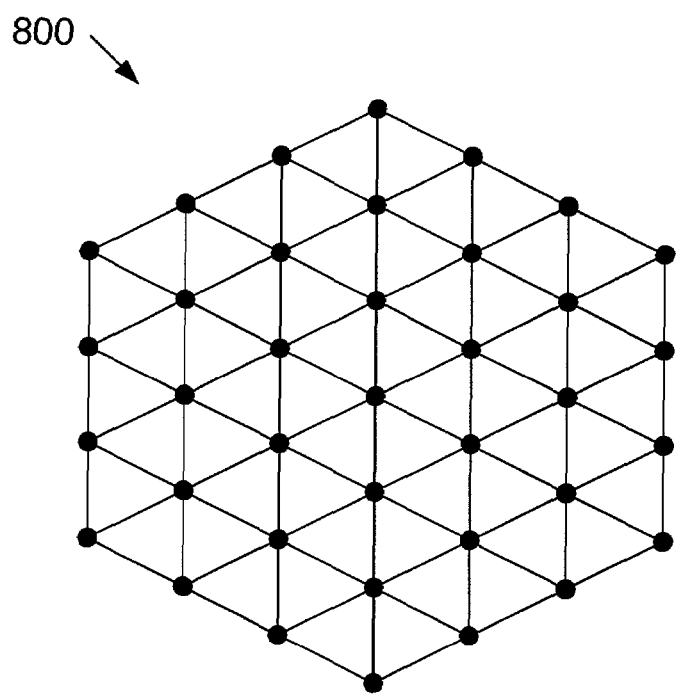
FIG. 11 is a diagram of one embodiment of a hex network interconnection fabric.

Referring to FIG. 11, a diagram of one embodiment of a hex network interconnection fabric is shown. A hex interconnection fabric 800 may be employed as the interconnection fabric depicted in FIG. 1. In FIG. 11, hex interconnection fabric 800 includes nodes interconnected by multiple independent communications paths. Similar to the interconnection fabrics described in the above FIGs., the nodes of hex interconnection fabric 800 of FIG. 11 may also be configured to control or be connected to devices such as hard disks, cache memories, RAID controllers and host communications interfaces.

Figure 12:
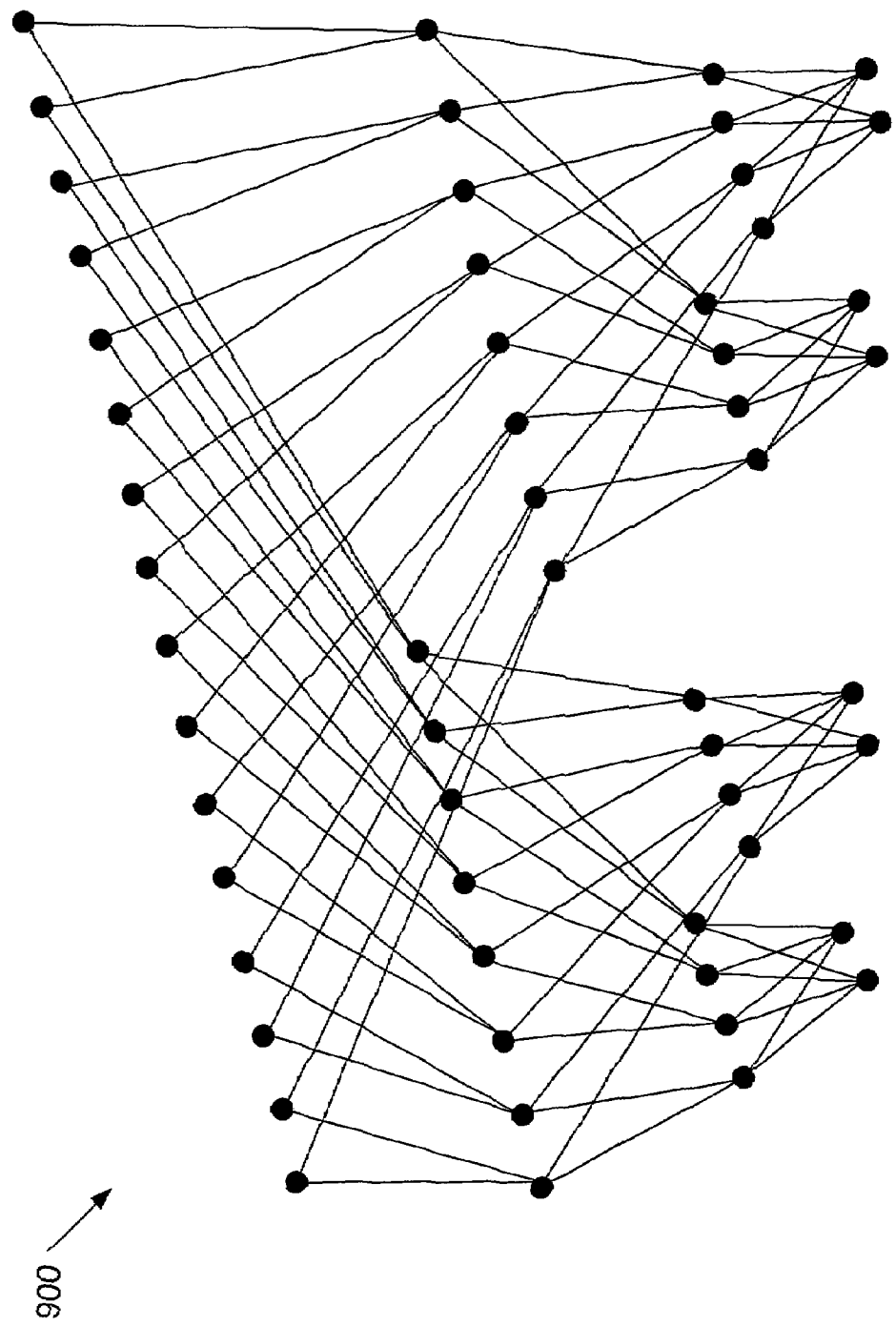
FIG. 12 is a diagram of one embodiment of a fat tree interconnection fabric.

Turning now to FIG. 12, a diagram of one embodiment of a fat tree interconnection fabric is shown. A fat tree interconnection fabric 900 may be employed as the interconnection fabric depicted in FIG. 1. The fat tree interconnection fabric 900 of FIG. 12 includes nodes interconnected by multiple independent communications paths. Similar to the interconnection fabrics described in the above FIGs., the nodes of fat tree interconnection fabric 900 of FIG. 12 may also be configured to control or be connected to devices such as hard disks, cache memories, RAID controllers and host communications interfaces.

Additionally, the multiple paths of the interconnection fabrics described in FIG. 10, FIG. 11 and FIG. 12 may allow for multiple parallel communications and/or disk operations that may be initiated over different paths, thereby possibly increasing the bandwidth and performance of the storage system. In a storage system with multiple controllers/host attachments, such as those described above, many parallel paths may exist between the hosts and the disks. Thus, many disk operations may be issued at the same time, and many data transfers may take place concurrently over the independent paths. This concurrency may provide a performance advantage and more scalability over bus-based architectures in which multiple devices must take turns using the same wires/fibre.

Numerous variations and modifications will become apparent to those skilled in the art once the above disclosure is fully appreciated. It is intended that the following claims be interpreted to embrace all such variations and modifications.

What is claimed is:

1. A storage system, comprising:
   a plurality of nodes, wherein different ones of said plurality of nodes perform different functional roles in the storage system;
   wherein a first portion of said plurality of nodes are storage nodes each comprising one or more mass storage devices;
   wherein a second portion of said plurality of nodes are one or more host interface nodes each configured to provide an interface for the storage system to one or more host computers; and
   an interconnection fabric configured for connecting each one of said plurality of nodes to every other one of said plurality of nodes;
   wherein the interconnection fabric comprises a plurality of point-to-point connections between said plurality of nodes, wherein said interconnection fabric is configured to provide a plurality of independent communication paths between each one of said plurality of nodes to every other one of said plurality of nodes, wherein the interconnection fabric comprises at least one of a torus interconnection fabric, a mesh interconnection fabric, a hypercube interconnection fabric, a multiple path butterfly interconnection fabric, a complete graph interconnection fabric, a hex network interconnection fabric, or a fat tree interconnection fabric.

2. The storage system as recited in claim 1, wherein each node is configured to communicate with each other node by routing messages bi-directionally.

3. The storage system as recited in claim 1, wherein said mass storage devices comprise disk drives.

4. The storage system as recited in claim 1, wherein a third portion of said plurality of nodes comprise random access memories configured as storage cache.

5. The storage system as recited in claim 1, wherein said mass storage devices comprise tape drives.

6. The storage system as recited in claim 1, wherein said mass storage devices comprise optical storage drives.

7. The storage system as recited in claim 1, wherein each node is configured to communicate with each other node by routing messages uni-directionally.

8. A method of interconnecting a plurality of nodes in a storage system, said method comprising:
   connecting each node to each other node using a plurality of point-to-point connections;
   forming an interconnection fabric comprising the nodes and said point-to-point connections, wherein the interconnection fabric comprises at least one of a torus interconnection fabric, a mesh interconnection fabric, a hypercube interconnection fabric, a multiple path butterfly interconnection fabric, a complete graph interconnection fabric, a hex network interconnection fabric, or a fat tree interconnection fabric;
   a source node sending a first message to a destination node over a first communication path in said interconnection fabric;
   said source node sending a second message to said destination node over a second communication path in said interconnection fabric, wherein said second communication path is independent from said first communication path;
   said destination node interfacing to a mass storage device to respond to said first and second communications;
   wherein different ones of said plurality of nodes perform different functional roles within the storage system, wherein a first portion of said plurality of nodes are storage nodes each comprising one or more mass storage devices, wherein said destination node is one of said first portion of said plurality of nodes, and wherein a second portion of said plurality of nodes are one or more host interface nodes each configured to provide an interface for the storage system to a host computer.

9. The method as recited in claim 8 further comprising nodes on said first and second communication path routing messages bi-directionally.

10. The method as recited in claim 8, wherein said mass storage devices comprise disk drives.

11. The method as recited in claim 8, wherein said mass storage devices comprise tape drives.

12. The method as recited in claim 8, wherein said mass storage devices comprise optical storage drives.

13. The method as recited in claim 8, wherein a third portion of said plurality of nodes comprise random access memories configured as cache memories for caching data stored in one or more mass storage devices.

14. The method as recited in claim 8 further comprising said source node interfacing to a host, wherein said source node is one of said second portion of said plurality of nodes.

15. The method as recited in claim 8 further comprising nodes on said first and second communication path routing messages uni-directionally.

16. A method for routing communications within a storage system comprising a plurality of nodes interconnected by an interconnection fabric, the method comprising:

sending a communication from a source node to a destination node using a first communication path comprising one or more point-to-point connections between said source node, any intervening nodes, and said destination node;

detecting a failure in said first communication path; and resending said communication from said source node to said destination node using a second communication path which is independent from said first communication path, wherein said second communication path comprises one or more point-to-point connections between said source node, any intervening nodes, and said destination node;

wherein different ones of said plurality of nodes perform different functional roles within the storage system, wherein a first portion of said plurality of nodes are storage nodes each comprising one or more mass storage devices, and wherein a second portion of said plurality of nodes are one or more host interface nodes each configured to provide an interface for the storage system to a host computer;

wherein said source node and said destination node are part of the plurality of nodes interconnected by the interconnection fabric, wherein the interconnection fabric comprises at least one of a torus interconnection fabric, a mesh interconnection fabric, a hypercube interconnection fabric, a multiple path butterfly interconnection fabric, a complete graph interconnection fabric, a hex network interconnection fabric, or a fat tree interconnection fabric.

17. The method as recited in claim 16, further comprising: detecting a failure in said second communication path; and resending said communication from said source node to said destination node using a third communication path which is independent from said first and said second communication paths, wherein said third communication path comprises one or more point-to-point connections between said source node, any intervening nodes, and said destination node.

18. The method as recited in claim 17, further comprising: detecting a failure in said third communication path; and resending said communication from said source node to said destination node using a fourth communication path which is independent from said first, said second and said third communication paths, wherein said fourth communication path comprises one or more point-to-point connections between said source node, any intervening nodes, and said destination node.

19. The method as recited in claim 16 further comprising said destination node interfacing to a plurality of mass storage devices, wherein said destination node is one of said first portion of said plurality of nodes.

20. The method as recited in claim 16 further comprising said source node interfacing to a plurality of mass storage devices, wherein said source node is one of said first portion of said plurality of nodes.

\* \* \* \* \*